(12) United States Patent
Cahill et al.

(10) Patent No.: US 9,009,145 B2
(45) Date of Patent: Apr. 14, 2015

(54) TRAVEL BOOKING METHOD AND SYSTEM

(75) Inventors: Lea Camille Cahill, Chelmsford, MA (US); Alexandra Candelas, Arlington, MA (US); Sean P. Carapella, Somerville, MA (US); Donna Leigh Goudie, Hollywood, FL (US); Mary G. Keagul, Lexington, MA (US)

(73) Assignee: Amadeus S.A.S., Biot (FR)

(*) Notice: Subject to any disclaimer, the term of this patent is extended or adjusted under 35 U.S.C. 154(b) by 399 days.

(21) Appl. No.: 12/850,365

(22) Filed: Aug. 4, 2010

(65) Prior Publication Data

US 2012/0036158 A1 Feb. 9, 2012

(51) Int. Cl.
*G06F 17/30* (2006.01)
*G06Q 10/02* (2012.01)

(52) U.S. Cl.
CPC .......... *G06F 17/30864* (2013.01); *G06Q 10/02* (2013.01)

(58) Field of Classification Search
USPC ......... 707/706, 713, 722, 723, 736, 737, 738, 707/741, 748, 752, 758, 781, 707/999.003–999.006; 701/201, 202
See application file for complete search history.

(56) References Cited

U.S. PATENT DOCUMENTS

| | | | |
|---|---|---|---|
| 7,634,503 | B2 | 12/2009 | Venugopal et al. |
| 2002/0046209 | A1 | 4/2002 | De Bellis |
| 2002/0194037 | A1* | 12/2002 | Creed et al. .................. 705/5 |
| 2003/0040946 | A1 | 2/2003 | Sprenger et al. |
| 2004/0078252 | A1 | 4/2004 | Daughtrey et al. |
| 2005/0097188 | A1 | 5/2005 | Fish |

(Continued)

FOREIGN PATENT DOCUMENTS

| | | |
|---|---|---|
| EP | 2 224 358 A1 | 9/2010 |
| WO | WO 02/15064 A2 | 2/2002 |
| WO | WO 2007/110352 | 10/2007 |

OTHER PUBLICATIONS

European Search Report for EP Patent Application No. 10 30 5862 (Dec. 29, 2010).

(Continued)

*Primary Examiner* — Syling Yen
(74) *Attorney, Agent, or Firm* — Wood, Herron & Evans, LLP

(57) ABSTRACT

A method for searching for a travel product having one or more data elements associated therewith from a plurality of potentially suitable travel products in a system comprising a web based interface for receiving inputs from a user and from one or more sources of data, and for displaying results to a user based on the inputs; a business logic layer providing access to the sources of data in a predetermined manner, such as based on rules and preferences; and a database including data relating to the parties associated with the system; wherein the method comprises the steps of: entering one or more search parameters into the interface; launching multiple simultaneous searches based on the search criteria and one or more attribute of the travel product to the one or more sources of data to identify the potentially suitable travel products; displaying the potentially suitable travel products on the interface; selecting one or more of the potentially suitable travel products for further processing; further processing the potentially suitable travel products by normalizing the data elements associated with the potentially suitable travel products into a homogeneous display; determining a combination of data elements of the one or more potentially suitable travel products which in combination are the most suitable travel products for a customer based on customer preferences and attributes.

9 Claims, 20 Drawing Sheets

(56) References Cited

U.S. PATENT DOCUMENTS

| | | | |
|---|---|---|---|
| 2007/0067193 A1 | 3/2007 | Robertson | |
| 2007/0226020 A1 | 9/2007 | Park | |
| 2008/0109156 A1* | 5/2008 | Park | 701/201 |
| 2009/0144260 A1 | 6/2009 | Bennett et al. | |
| 2010/0030590 A1 | 2/2010 | Sodaro | |
| 2010/0293011 A1* | 11/2010 | Lebreton et al. | 705/5 |
| 2011/0040749 A1* | 2/2011 | Ceri et al. | 707/723 |

OTHER PUBLICATIONS

Notification of Transmittal of Internation Search Report and the Written Opinion of the International Searching Authority, or the Declaration for International Application No. PCT/EP2011/061981 (Aug. 11, 2011).

EPO, "Notice from the European Patent Office concerning Business Methods," Official Journal of the European Patent Office (Nov. 1, 2007).

The DIS Discussion Forums, "Do you Split your stay between two resorts" May 1, 2004.

USPTO, Office Action issued in related U.S. Appl. No. 12/560,948 dated Dec. 31, 2012.

USPTO, Office Action issued in U.S. Appl. No. 12/560,948 dated Dec. 18, 2014.

* cited by examiner

Fig. 4

NO TRAVELER ▼  ⇧ Air  Car  Hotel  Quick Find
□ A20SEPORDBOS8A^AA

| Date | From | To | Time |
|---|---|---|---|
| − 20 Sep 2010, Mon | ORD | BOS | 8:00A |
| + | | | |

▼Optional Qualifiers
⦿ Per Leg  ○ Per Trip

| Include Airlines | Include Connect Cities | Cabin Class | Booking Class | Time Window |
|---|---|---|---|---|
| AA | | | | |

□ Direct  □ Non-Stop

400 — (header bar)
402 — (time field)
404 — (AA field)
408 — Availability / Fare

TRIP BUILDER

ORD-BOS 20Sep

| CAT | From-To | Flight No. | Dept | Arr | Equip | Stops | Class of Service | PAX/VIP |
|---|---|---|---|---|---|---|---|---|
| 1  1 0 1 | ORD BOS | UA 524 | 6:15A | 9:32A | 319 | 0 | F8 A7 Y9 B9 M9 E9 U9 H9 Q9 V9 W9 S9 T9 L9 KC GC | 3  2 |
| 2  3 0 0 | ORD BOS | CO:UA 6765 | 6:15A | 9:32A | 319 | 0 | F7 C8 D7 Z7 Y9 H9 B9 M9 K9 Q9 U9 V9 G9 W9 E9 S9 T9 N9 L9 | 3  2 |
| 3  2 1 0 | ORD BOS | AA 876 | 6:30A | 9:40A | 738 | 0 | F7 A7 P7 Y7 H7 B7 K7 M7 L7 W7 V7 G7 S7 N7 Q7 O7 | 3  2 |
| 4  1 0 1 | ORD BOS | UA:"7660 | 7:40A | 10:54A | E70 | 0 | F6 A6 Y9 B9 M9 E9 U9 H9 Q9 V9 W9 S9 T9 L9 KC GC | 3  2 |

| | | | | | | |
|---|---|---|---|---|---|---|
| 5 | 🏪🏪🗇<br>3 0 0 | ORD BOS | CO:"7867 | 7:40A | 10:54A | E70 | 0 | F6 C6 D6 Z6 Y9 H9 B9 M9<br>K9 Q9 U9 V9 G9 W9 E9 S9<br>T9 N9 L9 | 3 2 |
| 6 | 🏪🏪🗇<br>2 1 0 | ORD BOS | AA 1698 | 8:45A | 11:50A | 738 | 0 | F7 A7 P7 Y7 H7 B7 K7 M7<br>L7 W7 V7 G7 S7 N7 Q7 O7 | 3 2 |
| 7 | 🏪🏪🗇<br>1 0 1 | ORD BOS | UA:" 7722 | 9:00A | 12:13P | E70 | 0 | F6 A6 Y9 B9 M9 E9 U9 H9<br>O9 V9 W9 S9 T9 L7 KC GC | 3 2 |

| TRIP QUOTES | | | | | |
|---|---|---|---|---|---|
| A | | | | | |
| 101.90 USD | | | | | |
| 20Sep | ORD BOS | AA 876 | 6:30A | 9:40A | [x] Q1 |
| 489.40 USD | | | | | |
| 22Sep | BOS DCA | AA:"4432 | 3:05P | 4:45P | [x] V1 |
| 24Sep | DCA ORD | AA 867 | 5:20P | 6:30P | Q1 |
| Total 591.30 USD | | | | | |

[Hold] [Book]

Email + ▭ ↑

Fax + ▭ ↑

*Fig. 5 (continued)*

MOTT Michelle ▼    [ ] ▼    Apollo ▶

| Date | From | To | Time | | |
|---|---|---|---|---|---|
| 20 Sep 2010, Mon | ORD | BOS | 8:00A | Departure | Availability |
| 22 Sep 2010, Wed | BOS | DCA | 3:00P | Departure | Fare |
| 24 Sep 2010, Fri | DCA | ORD | 5:00P | Departure | |

− +

▼ Optional Qualifiers
⊙ Per Leg  ○ Per Trip

| Include Airlines | Include Connect Cities | Cabin Class | Booking Class | Time Window |
|---|---|---|---|---|
| ... | ... | ... | ... | ... |

☐ Direct  ☐ Non-Stop

*Fig. 7*

| ORD-BOS 20Sep | | BOS-DCA 22Sep | | DCA-ORD 24Sep | | | | | TRIP BUILDER |
|---|---|---|---|---|---|---|---|---|---|
| CAT | From-To | Flight No. | Dept | Arr | Equip | Stops | Class of Service | PAX/VIP | |
| 1 ▯▯▯<br>1 0 1 | BOS DCA | UA:US 2072 | 11:00A | 12:25P | 319 | 0 | F9 A8 Y9 B9 M9 E9 U9 H9<br>Q9 V9 W9 S9 T9 L9 K9 G9 | 3   2 | Preference Policy |
| 2 ▯▯▯<br>1 0 1 | BOS DCA | UA:US 2074 | 12:00P | 1:29P | 319 | 0 | F9 A8 Y9 B9 M9 E9 U9 H9<br>Q9 V9 W9 S9 T9 L9 K9 G9 | 3   2 | Active Trips |
| 3 ▯▯▯<br>3 0 1 | BOS DCA | DL:"6383 | 12:30P | 2:10P | CRJ | 0 | Y9 B9 M9 H9 Q9 K9 L9 V9<br>T9 | 3   2 | Trip History |
| 4 ▯▯▯<br>1 0 1 | BOS DCA | UA:US 2076 | 1:00P | 2:28P | 319 | 0 | F6 A6 Y9 B9 M9 E9 U9 H9<br>Q9 V9 W9 S9 T9 L9 KC GC | 3   2 | Unused Tickets |
| 5 ▯▯▯<br>2 1 0 | BOS DCA | AA:"4677 | 1:25P | 3:00P | ERD | 0 | Y7 H7 B7 M7 K7 V7 L7 G7<br>W7 S7 N7 Q7 O7 | 3   2 | |

*Fig. 7 (continued)*

| ORD-BOS 20Sep | BOS-DCA 22Sep | | | DCA-ORD 24Sep | | | | |
|---|---|---|---|---|---|---|---|---|
| CAT | From-To | Flight No. | Dept | Arr | Equip | Stops | Class of Service | PAX/VIP |
| 1  1 0 1 | DCA ORD | UA 619 | 1:45P | 2:58P | 319 | 0 | F1 AC Y9 B9 M9 E9 U9 H9 Q9 V9 W9 S9 T9 L9 KC GC | 3  2 |
| 2  1 0 1 | DCA ORD | CO:UA 6536 | 1:45P | 2:58P | 319 | 0 | C1 DC ZC Y9 H9 B9 M9 K9 Q9 UC VC GC WC EC SC TC NC LC | 3  2 |
| 3  3 0 1 | DCA ORD | AA 417 | 2:00P | 3:00P | 738 | 0 | F7 A7 P7 Y7 H7 B7 K7 M7 L7 W7 V7 G7 S7 N7 O7 Q7 | 3  2 |
| 4  1 0 1 | DCA ORD | UA 612 | 2:45P | 3:57P | 319 | 0 | F1 AC Y9 B9 M9 E9 U9 H9 Q9 V9 W9 S9 TC LC KC GC | 3  2 |
| 5  2 1 0 | DCA ORD | CO:UA 8538 | 2:45P | 3:57P | 319 | 0 | C1 DC ZC Y9 H9 B9 M9 K9 Q9 UC VC GC WC EC SC TC NC LC | 3  2 |
| 6  2 1 0 | DCA ORD | AA:" 3701 | 3:15P | 4:20P | CR7 | 0 | F7 A7 P7 Y7 H7 B7 K7 M7 L7 W7 V7 G7 S7 N7 O7 Q7 | 3  2 |
| 7  2 1 0 | DCA ORD | UA 623 | 3:45P | 4:57P | 319 | 0 | F1 AC Y9 B9 M9 E9 U9 H9 Q9 V9 W9 S9 TC L9 KC GC | 3  2 |

*Fig. 8*

| | | | |
|---|---|---|---|
| Policy | Active | Past | U TKT |

Trip Builder — 800

Clear Builder

20Sep ORD-BOS UA 524 6:15A 9:32A Y1 [x]

20Sep ORD-BOS AA 576 6:30A 9:40A Y1 [x]

22Sep BOS DCA AA:"4432 3:05P 4:45P Y1 [x]

24Sep DCA ORD AA:"3701 3:15P 4:20P Y1 [x]

24Sep DCA ORD UA 625 4:45P 5:57P Y1 [x]

Price — 802    View — 804

*Fig. 8 (continued)*

| | | | | | | | |
|---|---|---|---|---|---|---|---|
| 5 | 🖥🖥 1 0 1 | 24 Sep | DCA ORD | UA 621 | 2:45P | 3:57P | 0 | F1 A0 Y9 B9 M9 E9 U9 H9<br>Q9 V9 W9 S9 T0 L0 K0 G0 |
| 6 | 🖥🖥 2 1 1 | 24 Sep | DCA ORD | AA:" 3701 | 3:15P | 4:20P | 0 | F7 A7 P7 Y7 H7 B7 K7 M7<br>L7 W2 V0 G0 S0 N0 Q0 O0 |

▲ Optional Pricing Qualifiers     ▲ Manual Pricing

[Auto Price]

▲ Optional Pricing Qualifiers   Fares are shown in USD

▽ FARES    Trip-0,0,0                      Trip-0,0,0
904
341.29  P                                   403.68  P
Corporate 18Jun                             Corporate 18Jun 418.60  P                                   496.60  P
Published 18Jun                             Published 18Jun 1285.10  P                                  1285.10  P
Published 18Jun                             Published 18Jun 3182.10  P                                  2982.10  P
Published 20Sep                             Published 20Sep

*Fig. 9 (continued)*

▼ FARE AND COMPARE

| 179.40 USD P | | | | | | | | Book |
|---|---|---|---|---|---|---|---|---|
| | | | | | | | | View |
| 2 0 0 | 20 Sep | ORD DEN | AA 1091 | 7:55A | 9:30A | 0 | Q QA14XQU1 3 2 | Quote |
| See with other flights | | | | | | | | |
| 1 0 0 | 22 Sep | DEN ORD | UA 32 | 9:11A | 12:37P | 0 | K KAG21KS 3 2 | |
| See with other flights | | | | | | | | |

| 179.40 USD P | | | | | | | |
|---|---|---|---|---|---|---|---|
| 2 0 0 | 20 Sep | ORD DEN | AA 1091 | 7:55A | 9:30A | 0 | Q QA14XQU1 3 2 |
| See with other flights | | | | | | | |
| 1 0 0 | 22 Sep | DEN ORD | UA 258 | 9:40P | 12:57A+1 | 0 | K KAG21KS 3 2 |
| See with other flights | | | | | | | |

*Fig. 10 (continued)*

ACTIONS

Ignore
Ignore & Retrieve

Cancel Itinerary & End

- Add PAssive Segment
- Ticket Exchange
- Bagage Fees
- Copy
- Access Finish Page
- Access TB Workspace
- Add Remarks

- Overrides
- QC
- Server Side Scripting
- Partner Programs
- Void-Refund

Booking Summary

Traveler
Sean Tester
Trip Status
Confirmed
Trip reason
Business
Applied Unused Ticket
Status
Booking File Locator
NCLEJS
Agent Ticketing or Action
Date
23 Aug 2010
Prices Air
x 284.40 USD
Purchase By 9 Oct
Trip Total
284.40 USD Air
Quick Sell Car

| DL:**6577 | ⓤ | 9 Oct, Sat | JFK ORD | 9:35A-11:19A | T | TA21X3SD | 18C | HK1 | PGZ41Y | Frequent Flyer |

Quick Sell Car

▸ Enter Segment Remarks
▸ More Details

| UA 0101 | | 10 Oct, Sat | ORD LAX | 7:15A-9:37A | S | SA14KN | 17C | HK1 | Z387KW | Frequent Flyer |

Quick Sell Car

▸ Enter Segment Remarks
▸ More Details
▸ Other Services
▸ Remarks

Trip Builder Workspace Return to availability

▼ FLIGHTS

Segment Pricing [+]

FARES [+]   Fares are shown in USD

FARE AND COMPARE

Trip Builder Workspace Return to availability

▼ FLIGHTS

Segment Pricing 1 2 [+]

| | | | | | | | |
|---|---|---|---|---|---|---|---|
| 1 | 🖨 ☐ | 1 3 0 | 9 Oct | JFK ORD | DL:**6577 | Ⓤ 9:35A 11:19A 0 | F9 A9 Y9 B9 M9 H9 Q9 K9<br>L9 U9 T9 KC |
| 2 | 🖨 ☐ | 3 2 0 | 10 Oct | ORD LAX | UA0101 | 7:15A 9:37A 0 | F9 A9 Y9 B9 M9 E9 U9 H9 (T1)<br>Q9 V9 W9 S9 T9 L9 K9 GC (S1) |

▶ Optional Pricing Qualifiers   [Auto Price] [Partial Exch]   ▲ Manual Pricing

```
┌─────────────────────────────────────┐
│         TRIP QUOTES                 │
│       BOOKING SUMMARY               │
│ View full booking summary           │
│ (IMPORT)                            │
│ DL:**6577  9 Oct JFK ORD 9:35A 11:15A T1 │
│ UA0101  10 Oct JFK ORD 9:35A 11:15A T1   │
└─────────────────────────────────────┘
```

┌─────────────────────────────────────┐
│         TRIP QUOTES                 │
│       BOOKING SUMMARY               │
│ View full booking summary           │
│ IMPORT                              │
│ DL:**6577  9 Oct JFK ORD 9:35A 11:15A T1 │
│ UA0101  10 Oct JFK ORD 9:35A 11:15A T1   │
└─────────────────────────────────────┘

TRAVEL BOOKING METHOD AND SYSTEM

FIELD OF THE INVENTION

The present invention relates to an improved travel booking method and system.

BACKGROUND OF THE INVENTION

Within the context of traditional corporate travel reservations, travelers tend to ask for availability of flights and options on a point by point basis. That is, rather than specifying every leg of an entire trip to a travel counselor up front, a corporate traveler tends to investigate and discuss options one leg at a time. Within legacy GDS functionality (green screen mode), travel counselors have very granular and flexible functionality at their disposal to search available flights for a specific leg of a trip. They can select or sell several options for that particular leg and then move on to the next leg working in a linear fashion. Having potentially selected or sold several options for each leg, the travel counselor can then manipulate fare quotes and pricing by selecting specific flight legs in various combinations to achieve the most desirable itinerary and fare combination.

By comparison, the more robust low fare functionality found in the rich Graphical User Interface (GUI) applications on the Internet have generally been adopted in consumer user products.

Adoption of the new agent GUIs by corporate travel counselors has been low because these GUIs do not address or support the traditional corporate traveler call flow and mode of working as described above. Instead, the air search and pricing functionality of existing agent GUIs mainly mimic that of a consumer facing online travel agency (OLTA) or corporate online booking tool (OBT) where many itinerary and fare solutions are presented to an agent, but each solution is a bundle of pre-assembled flights representing the entire trip. While these applications offer the power of low fare search results and fare and compare functionality, they lack the flexibility and granularity of the legacy GDS to react and adjust to the questions, requests and needs of a corporate traveler. Agents are restricted to selecting a pre-assembled bundle of flight options, and have no opportunity to break the bundle to combine specific leg options to research and assemble the most desirable trip option for a corporate traveler. Even in the case where scheduled-based availability is displayed in existing graphical tools, they do not provide the granularity of information, nor the flexibility in relation to selecting and combining data that is required to address the needs of the corporate traveler.

This is not a new problem, but one for which a solution is sought.

WO0215064 discloses an interactive booking method and system in which flexible selection of legs can be carried out to modify an itinerary.

US20080109156 describes a three dimensional matrix selecting travel criteria and within a GUI.

US20040078252 discloses an interface for travel bookings based on a flexible date query.

WO2007110352 discloses an interface for a travel reservations system which is orientated towards the display of initial fare information.

Whilst the prior art documents offer some solutions to improving travel bookings, they do not present an adequate solution to all the problems associated with travel bookings and do not provide the flexibility required by corporate travel agents.

OBJECTS OF THE INVENTION

It is an object of the present invention to overcome at least some of the problems associated with the prior art.

It is a further object of the present invention to provide a method and system for improved travel bookings using optimized tools and normalized data display which increase flexibility and ease of operation for new and pre-existing bookings, while providing agency-defined control points and the ability to audit or change bookings.

SUMMARY OF THE INVENTION

The present invention provides a method and system as set out in the accompanying claims.

According to one aspect of the present invention there is provided a method for searching for a travel product having one or more data elements associated therewith from a plurality of potentially suitable travel products in a system comprising a web based interface for receiving inputs from a user and from one or more sources of data, and for displaying results to a user based on the inputs; a business logic layer providing access to the sources of data in a predetermined manner, such as based on rules and preferences; and a database including data relating to the parties associated with the system; wherein the method comprises the steps of: entering one or more search parameters into the interface;

launching multiple simultaneous searches based on the search criteria and one or more attribute of the travel product to the one or more sources of data to identify the potentially suitable travel products;

displaying the potentially suitable travel products on the interface; selecting one or more of the potentially suitable travel products for further processing; further processing the potentially suitable travel products by normalizing the data elements associated with the potentially suitable travel products into a homogeneous display; determining a combination of data elements of the one or more potentially suitable travel products which in combination are the most suitable travel products for a customer based on customer preferences and attributes.

Optionally, the normalizing step includes searching for additional parameters associated with the potentially suitable travel products.

Optionally, the normalizing step includes unbundling the potentially suitable travel products into multiple elements.

Unbundling may be carried out by displaying the travel product from the one or more sources; parsing the travel product to separate out each data element; launching multiple search requests to obtain additional dimensions of information for each data element; and normalizing the resulting data elements into a normalized display.

Optionally the method combines the elements of the potentially suitable travel products to produce a new potentially suitable travel product from one or more element of one or more potentially suitable travel products.

Optionally, the normalizing step includes searching for further attributes, parameters or associated data for the potential suitable travel products.

Optionally the web based interface is in the form of one or more graphic user interfaces (GUIs).

The invention simulates a cryptic process in GUI style while incorporating the richness of the GUI not provided in the cryptic process. The invention blends the best of both worlds and enhances each to provide more flexible and robust results to the agent.

The previous potential offerings in this area concentrated on enhancing what is available in the GUI environment without regard to the value of the legacy GDS air shopping and booking process for the agent or travel agency.

The invention further marries the power of low fare search with more traditional flexibility by allowing users to select a full itinerary solution from the low fare search results and view it in a Trip Builder Workspace whereby the itinerary from the solution is decomposed into its individual segments with all available fare classes. The individual segments or elements are able to be manipulated and combined with other flight segments for pricing.

During the booking process for a brand new itinerary, potential itineraries can be displayed either leg-by-leg in a schedule-based display or in itinerary bundles in a fare-based display. A leg is a single origin/destination pair and a bundle is a defined combination of all of the legs in a journey. Different data elements are available for display depending upon the method used by the underlying technology performing the search; this can include schedule-driven (Availability) or fare-driven (Fare) searches for example. A unique feature of the invention is the ability to combine the search results from both search methods into a normalized display in the Trip Builder Workspace. In order to accomplish the normalized display, the underlying technology parses the low-fare search results, separates the individual legs within each bundle, and executes availability commands for each leg in order to enrich the data elements associated with it. All resulting legs (from both schedule-driven and fare-driving searching) are then displayed in a logical sequence for the agent to examine, compare, and group in any combination in the Trip Builder Workspace for pricing. The Trip Builder Workspace need not be restricted to corporate travel agents, but instead could be used by corporations, leisure agents, consumers, etc. . . . .

The capability to combine scheduled-driven and low-fare search results into a single homogeneous display in the Trip Builder Workspace for initial itinerary creation is further extended by the invention to apply to post-booking itinerary modification processes. Typically, corporate travel agents spend significant time servicing travelers who require a change to an existing itinerary. Sometimes, the itinerary has not yet been ticketed. Other times the itinerary is in a ticketed state, but the traveler has not yet started to travel. Often, the traveler has flown one or more legs of the itinerary and is requesting a change to one or more future legs. In each of these cases, the agent can execute schedule-driven and/or fare-driven search requests for one or more of the unused leg(s) without losing the fare classes already booked. This process is made possible by an import feature. In this, an import operation on one or more of the legs in the itinerary is performed on request by the agent and the imported leg is displayed in the Trip Builder Workspace. The import is accomplished by technology using the same normalization logic which performs availability commands and combines schedule-driven and fare-driven results. At the time of the availability request, the class of service already booked may no longer be available and, thus, unable to be displayed. Since that class is actually already booked, the import functionality ensures that it is displayed in the Trip Builder Workspace so that it can be incorporated in subsequent pricing activities.

When using the legacy GDS capabilities, an agent has access to all available itinerary data and the freedom to create itineraries that may not meet the business objectives of their travel agency or the company in which the traveler is employed. Hence, an important consideration in creating a feature-rich GUI for use by corporate travel agents is the ability for the travel agency and/or corporation to define rules which may influence the itineraries being displayed, the display itself, and/or the ultimate itinerary booked by the agent. This aspect, combined with the ability to track all agent activity and enforce certain agent actions, provides additional and unique benefits over the existing legacy GDSs and is a key driving force behind travel agencies' desire for a GUI environment as provided by the present invention.

BRIEF DESCRIPTION OF THE DRAWINGS

Reference will now be made, by way of example, to the accompanying drawings, in which:

FIG. 4 is an example of a first screen shot associated with the system, in accordance with an embodiment of the invention, given by way of example;

FIG. 5 is an example of a second screen shot associated with the system, in accordance with an embodiment of the invention, given by way of example;

FIG. 7 is an example of a fourth screen shot associated with the system, in accordance with an embodiment of the invention, given by way of example;

FIG. 8 is an example of a fifth screen shot associated with the system, in accordance with an embodiment of the invention, given by way of example;

FIG. 11 is an example of an eighth screen shot associated with the system, in accordance with an embodiment of the invention, given by way of example.

FIG. 12 is an example of a ninth screen shot associated with the system, in accordance with an embodiment of the invention, given by way of example.

DETAILED DESCRIPTION OF THE PREFERRED EMBODIMENTS

The present invention relates to how travel agents search for, price, quote, and book air flight reservations etc on one or more global distribution systems (GDS) through a graphical user interface (GUI).

This invention combines the benefits of a GUI with the granularity and flexibility that corporate travel agents are accustomed to. The flexible system not only allows the agent to enter all legs of a trip at once, but also allows an agent to request availability for each leg of a trip, one at a time, in the way that they would traditionally be able to do in the legacy GDS. Optional qualifiers may also be added to the search criteria at the leg level or applied to the entire trip.

Regardless of whether an agent originally searched for an entire trip or searched one leg at a time, the available schedule search results are presented to the agent in individual tabs for each leg. Agents can then request availability for additional legs or remove the availability tab for a leg that is no longer of interest. Using these tabs of availability, agents can select flight options for each leg to assemble and manipulate their own solutions. This has many benefits to the agent and the traveler.

Figure 1:
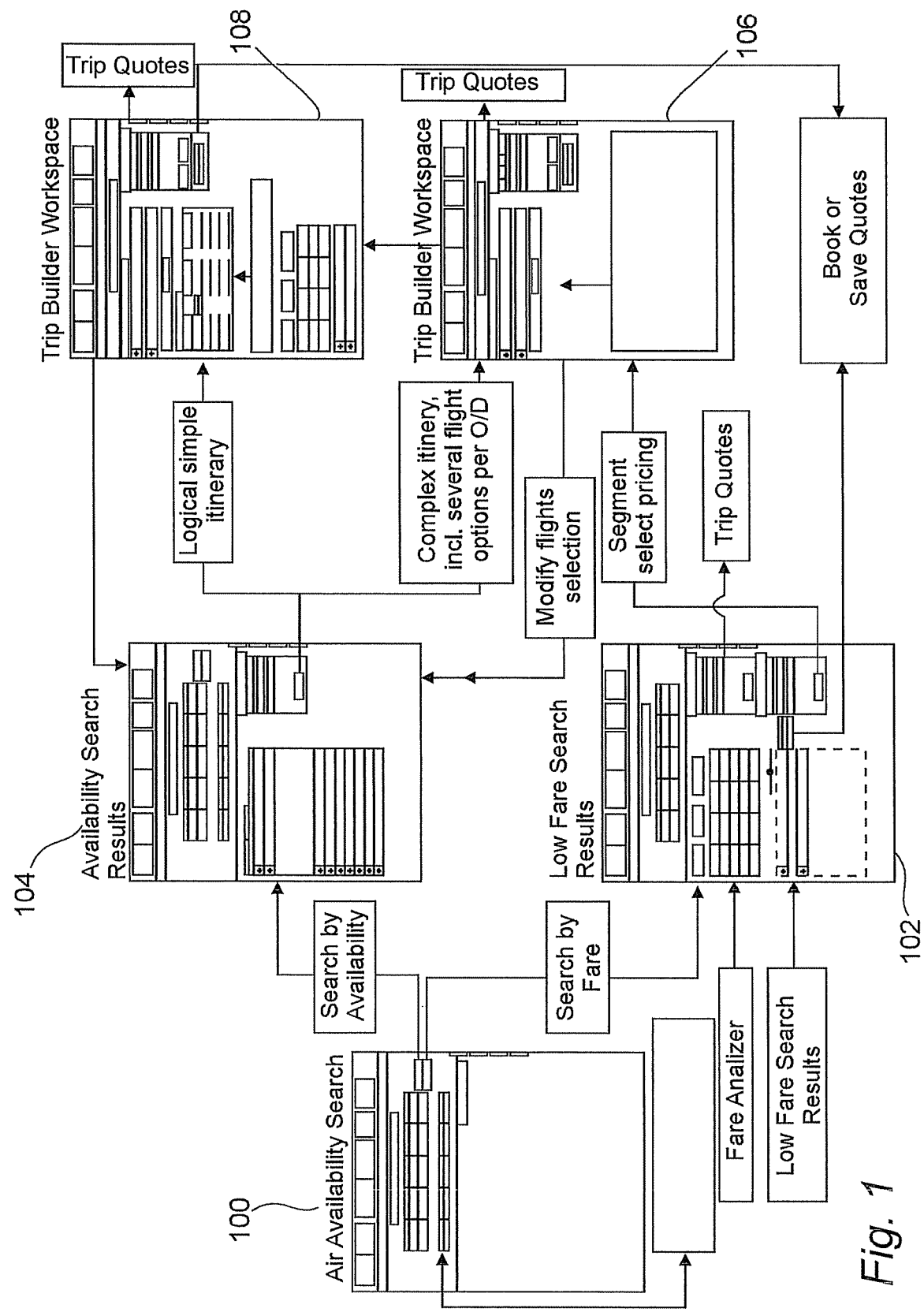
FIG. 1 is a block diagram of the architecture for a travel booking system, in accordance with an embodiment of the invention, given by way of example.

Referring to FIG. 1, the invention consists of a user interface with an underlying business logic layer that includes API access to several GDS or other supply systems, or sources of information for flight schedule, availability, fare data, etc. Additionally, a database layer stores specific data about the agent, the customer, and the traveler for and by whom requests are made etc. In a preferred implementation, the invention is part of a web based application in which travel agents use a web browser to access the application. Other implementations within other GUI frameworks are possible.

Referring in more detail to FIG. 1, the diagram shows a flow for a search for travel options or a travel product from a plurality of potential suitable travel products to find suitable travel products which meet search parameters. The travel product may comprise a trip including one or more legs, or may comprise a trip and a hotel or any other combination of segments or elements which might be required by an end user from an agent or user of the system. The potential suitable travel products may comprise the whole trip or elements thereof, such as individual legs of a journey, or hotel or car reservations. A first screen, the air availability search 100 is displayed to an agent or user. This is used to enter search parameter and to make selections of various options for the search. In order to enter the search parameter the agent is given a series of user interface controls, such as tables, text boxes, buttons etc. within an HTML form. The agent can enter specific search fields and can invoke a transaction to an underlying supply system, such as a GDS, in which the fields are used as parameters in the search request. The user may enter search parameters in any appropriate manner, including but not limited to GDS cryptic commands.

In a preferred embodiment the system may include Cryptic Magic as described in co-pending application number EP09305180.3. For the purposes of the backend system, there is no difference whether the search parameters are entered in cryptic or a normal format such as HTML, as the data is generally normalized by a parsing process. FIG. 4 shows a more detailed representation of the air availability search screen. Search criteria may be entered in cryptic form in box 400 and in normal format in box 402. Additional qualifying parameters can be entered in box 404. Entry of any search parameters may immediately bring up results, as shown in window 406. FIG. 4 also shows a search button 408, which can launch either an Availability or a Fare based search. The agent then enters the search parameters and elects either the Fare search or the Availability search. These are examples of the travel product attributes, but there may be others which can be used or that may be of interest.

In either case, the business logic layer is used to interpret the user input and use the data to build a request transaction to the API of any connected GDS and other supply systems or content source systems to obtain data.

When multiple supply and content sources are used, the requests are multi-threaded and sent concurrently. When the responses from the content and supply systems are received, internal business logic interrogates the database layer to retrieve specific configuration settings and parameters associated with the agent, corporation, traveler or any other party involved in the request. The responses from the content and supply systems are then interpreted and combined with the data retrieved internally. The aggregated data is then sorted and filtered based on parameters for the specific agent and/or customer. The structured data within the aggregated result set is stored within a JavaScript object and used to update the HTML presentation to the agent as a list of search result solutions. The results of the Fare search are shown in screen 102 and the results of the Availability search are shown in screen 104, in FIG. 1.

Figure 5:
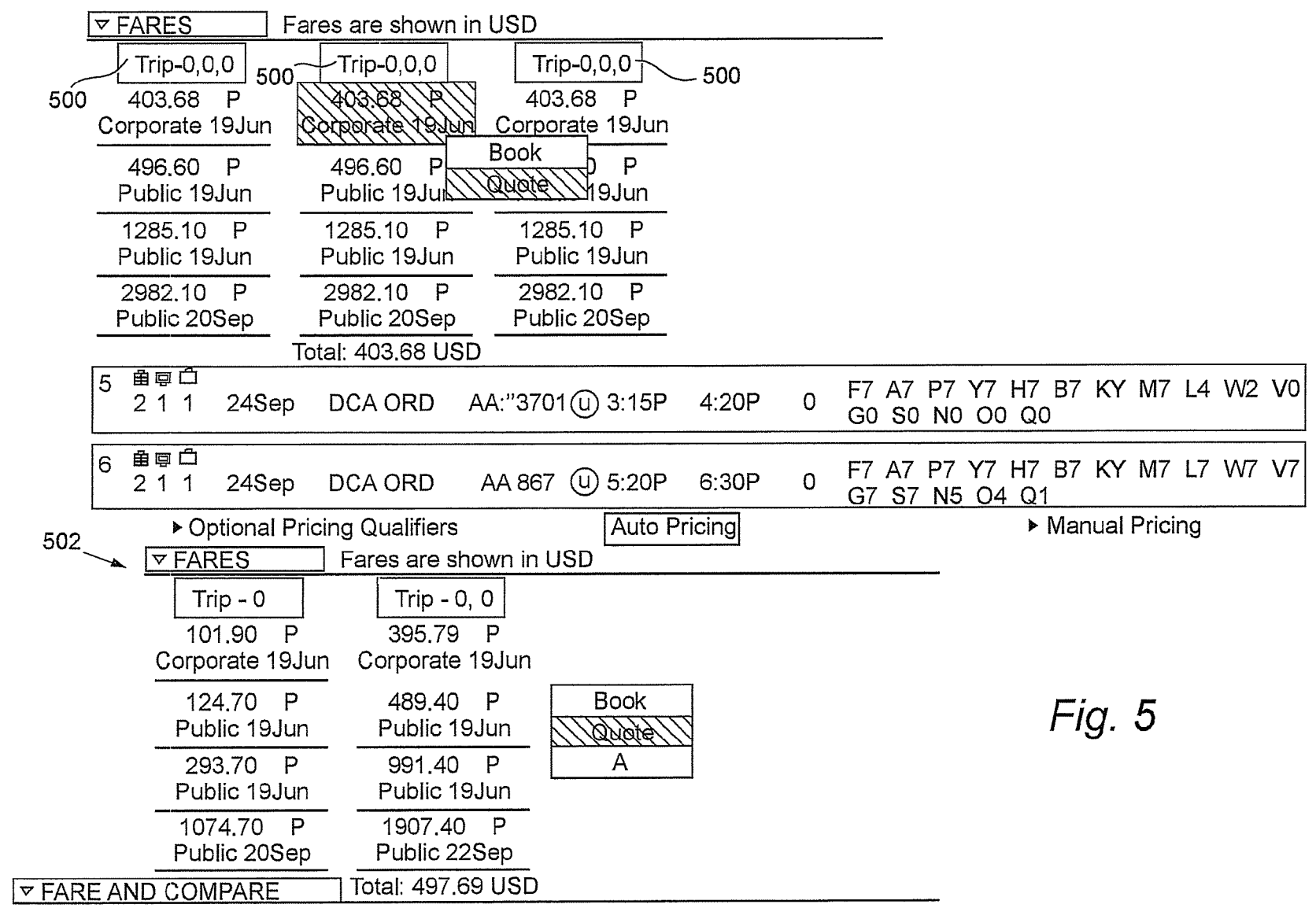
Figure 6:
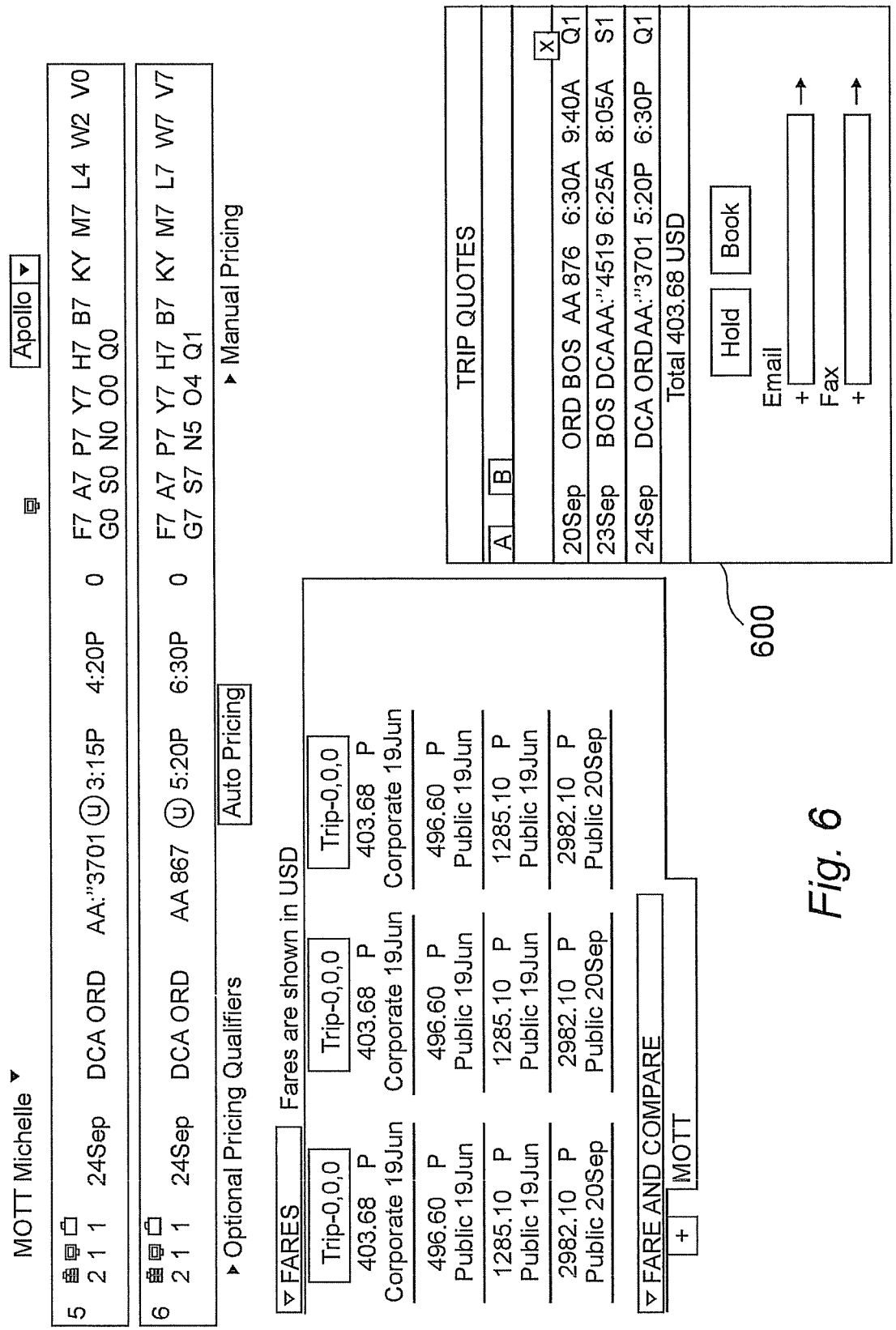
FIG. 6 is an example of a third screen shot associated with the system, in accordance with an embodiment of the invention, given by way of example.

If the Fare option is selected by the agent, the JavaScript object contains the results of a Low Fare Search request to the underlying supply system and will be used to update the HTML form presenting the priced solutions to the user in an Amadeus Fare Analyzer (as described in U.S. Pat. No. 7,634,503). A more detailed representation of the results shown in screen 102 is shown in FIGS. 5 and 6. FIG. 5 shows a number of fares 500 for a trip or leg of a journey. The agent can use this information to generate a quote for a passenger or to book or hold a specific fare quote. FIG. 5 also shows the fares for different segments 502. The agent can use this space to add further information, options or segments to a first fare quote. FIG. 6 shows a trip quotes window 600 which can be populated by the agent from the fare quotes. The trip quote information can be sent to a passenger, or held or booked if required.

If the Availability option is selected the Javascript objects containing the result data for each search is used to update the HTML presentation to the agent. This is shown in more detail in FIGS. 7, 8 and 9. The Availability results show the details of the various legs for a trip in section 700. This can be updated by the agent as required or can be entered at the start as a complete journey. The availability is returned in a set of tabs 702, each of which represents a leg (or origin and destination) of a trip. The individual JavaScript objects, including the availability search result data may be held in a cache in a local memory so that the agent may return to the tabs at any point in the process. It should be noted that the travel booking domain operates in real time. As a result, in reality the data that is stored is only valid for a short period of time, due to the transient nature of a travel booking environment.

Returning to FIG. 1, the next step of the process may involve additional and subsequent searches and other actions. For the Fare search a further action may be to book or save a quote. Alternatively trip quotes can be generated for a passenger. In another situation further searches may be carried out. The results of the Fare search may be incorporated into an appropriate, trip builder workspace 106, 108. This will be explained in greater detail below.

Figure 9:
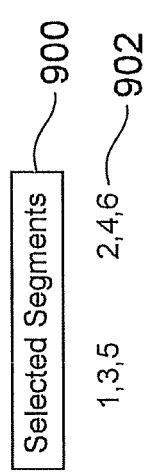
FIG. 9 is an example of a sixth screen shot associated with the system, in accordance with an embodiment of the invention, given by way of example.

Similarly, with the Availability search further actions may also be carried out. The Fare information may be sought and other functions may be carried out within the trip builder workspace 106, 108 or elsewhere. The other functions may relate to itinerary management, pricing and fares. FIG. 9, shows an availability result which is being worked on by an agent. The agent can select different segments 900 to price different versions of a trip. Also, the agent can enter multiple segments 902 and request prices for the multiple segments. For each combination of flights a faring solution 904 can be provided. These can include, but are not limited to: round trip lowest negotiated; round trip lowest public; round trip no penalty negotiated; round trip no penalty public; one way pricing for each segment.

One result of the additional processing on the data is that the data is essentially normalized. This normalizing means that all the results have the same types of data therein. In other words, for a Fare search, availability data is added at the normalizing stage and for an Availability search Fare data is added at the normalizing stage. As a result, the final data which is analyzed by the agent in the Trip Builder Workspace includes the same fields irrespective of the rout taken. This makes selection of the best options for the passenger a simple operation.

In both cases where attribute searches are carried out, the user may select specific search results to manipulate and process further. For example, a user may select a number of potential suitable travel products to form a solution which satisfies the requirement for the end user for the required travel product. The user may conduct further searches to add further attributes or other data of interest. Where the potential suitable travel products are trips in their entirety, the user may unbundle these to enable individual elements to be selected and combined with other elements of potential suitable travel products to produce the required travel product. These and other forms of manipulation, processing and selection are described in greater detail below. The invention thus comprises a unique feature in which the search results from both search methods are put into a normalized homogenous display in the Trip Builder Workspace. In order to accomplish the normalized display, any low-fare search results are unbundled and separated into the individual legs within each bundle. This is carried out by parsing the low-fare search results and separating the result into one or more discreet elements, such as legs. In addition in the Trip Builder Workspace further availability searches are launched for each leg in order to enrich the data elements associated with it. All resulting legs (from both schedule-driven and fare-driven searching) are then displayed in a logical sequence for the agent to examine, compare, and group in any combination in the Trip Builder Workspace for pricing. As the low-fare elements have been unbundled into individual elements or legs, the agent can take elements from all searches to create an itinerary.

The homogenous display includes legs from both availability or fare searches which have been respectively "fared" and "unbundled" and availability added.

The agent may update the HTML form to populate additional rows of any search table to create additional requests for further availability or other information. The request is structured, sent to the supply and content systems, aggregated with additional data, and sorted and filtered as described above. The new availability search result data is used to create an additional JavaScript object that will update the HTML presentation with in additional tab listing the results for any new search results.

The agent may select an individual search result item, such as specific flights within each tab of the HTML form. By selecting individual search result items, a new JavaScript object is created storing the data for the individual selections made by the agent. Additionally, this object is used to update the HTML interface with a new control displaying a subset of the data for each selected item. This user interface control is a Trip Builder control 800 as shown in FIG. 8, which tracks the selections made by the agent as well as presents options to Price or View the options. Once the agent has selected all desired result items, the results can be viewed in the Trip Builder control, which is described in more details below.

From the Trip Builder control, the agent can select a Price button 802 on the form. The invention uses the data within the JavaScript object to construct a structured request to the GDS or supply system API to price the selected itinerary. A concurrent request is sent to the GDS or supply system as a Low Fare Search request to gather results for alternative options for presentation to the agent in the Amadeus Fare Analyzer.

The API responses are interpreted and used to update the JavaScript object with additional pricing data for the selected flights. The updated JavaScript object is used to update the HTML and display the pricing result to the agent in a new form titled the Trip Builder Workspace, which is described in great detail below.

From the Trip Builder control, the user may also select a View button 804 on the form. The invention uses the data with the JavaScript object to update the HTML and display the selected flights in the Trip Builder Workspace.

Figure 10:
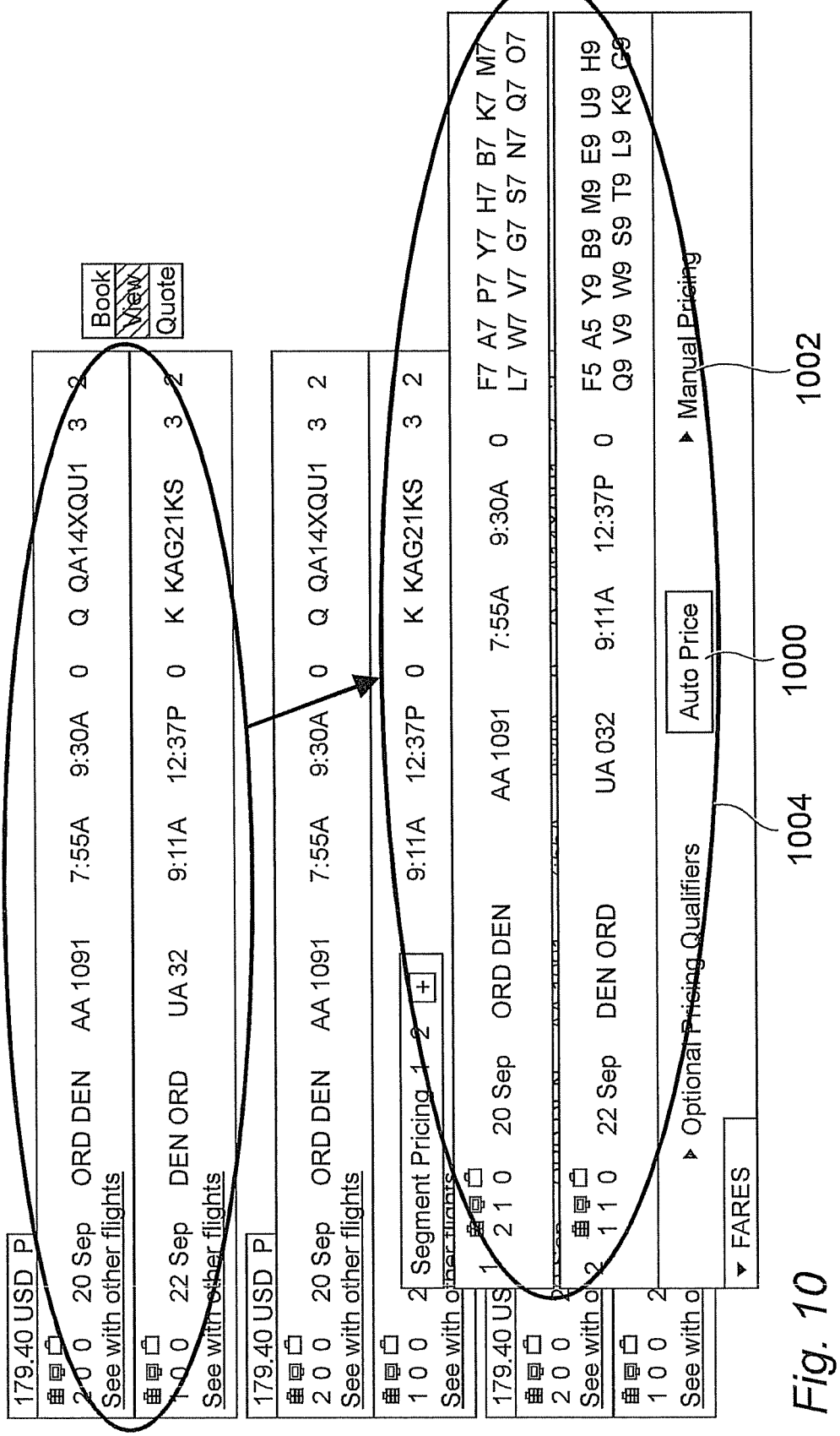
FIG. 10 is an example of a seventh screen shot associated with the system, in accordance with an embodiment of the invention, given by way of example.

The Trip Builder Workspace is shown in FIG. 10 and is an HTML form that presents specific flight options that the agent has previously selected. From this form, the agent may elect to return to the Availability form to select additional flights to bring into the Trip Builder Workspace, search for additional availability or modify the existing availability result sets.

Agents are able to select specific flight options within this workspace to select them for pricing purposes. An agent may select the flight options to be included in a pricing request or segment selection in order to create an itinerary. Multiple itineraries can be created using this segment selection process. As the agent completes a unique combination of segments, the combination is added to the list of itineraries to be priced by using an add button. Each combination is an indexed array of data from the individual segment data that will be used to generate a pricing request to the GDS or other supply system. When agents have completed creating combinations of selected segments, Auto Price 1000 is selected. Manual Pricing 1002 and Optional Pricing qualifiers 1004 can also be selected if required. The data from each created combination is used to construct a structured request to the GDS or supply system API to price the selected combination or itinerary. An additional API request is sent to the GDS or the supply system as a Low Fare Search request to gather results for alternative options for presentation to the user in the Amadeus Fare Analyzer. These requests are multi-threaded and sent concurrently.

The API responses are interpreted and used to update the HTML form with the resulting price responses for display to the agent. Ajax is used to update the form dynamically, so that the result set can be displayed while waiting for additional data to populate for HTML form update.

An additional function includes the ability for the agent to select a pricing result from the Fare Analyzer and use a selection feature to bring the individual flights within the priced itinerary into the Trip Builder Workspace for further manipulation by means of the API. In this way, agents are able to unbundle the flight segment combinations that are returned from a Low Fare Search result as described above. That is, from the Low Fare Search Results that contain pre-assembled solutions of complete itineraries with price, an agent can select a specific itinerary/price solution and is presented with options to either Book, View, or Quote the itinerary. The View option will bring the itinerary into the Trip Builder Workspace. The invention will then retrieve the availability for the individual segments of the itinerary and display each segment with all available fare classes in the workspace. Agents are then able to select these segments with (or without) others already in the workspace for Segment Select Pricing research as described above.

Agents may repeat this process for multiple combinations of flights creating several disparate price results as the best alternatives are sought.

The agent may select individual itinerary or price result items within the HTML form to select them for further action. When selected, the HTML form is updated to generate a new user interface control called the Trip Quotes. This control tracks the itinerary or price selections selected by the agent as well as presenting to the agent a mini itinerary view with prices.

The Trip Quotes control displays all selected itinerary or price solutions selected by the agent. Each individual solution is presented in a separate tab of this control. FIGS. 5 and 6 show examples of Trip Quote control blocks 504 and 600 respectively. Agents may elect to remove specific solutions by selecting a delete button. Agents may also elect to return to the Trip Builder Workspace to create additional solutions for inclusion in the Trip Quotes control. From the Trip Quotes control, agents can request an email or a fax to the traveler. By selecting a link for email or fax, the system will interrogate the database layer to retrieve the email address or fax number of the traveler and construct a message to the customer containing the formatted data of the selected itinerary(ies) with prices. The system will then deliver the message to the traveler.

Agents may elect to Book or Hold the itinerary/price solutions within the Trip Quotes. If the agent elects to Hold an itinerary, the itinerary and price data is stored in the database layer and can be retrieved later by the agent for follow up action. If the agent elects to Book an itinerary, the system will use all data within the object to construct the structured API requests to the GDS or supply system to create a reservation for the selected itinerary and price.

An important principle of the present invention is flexibility and circularity. That is, the agent is able to return to any portion of the workflow from any other point in the workflow. Agents are able to return to the search area to update existing search parameters, create new search parameters, or remove existing search parameters. Additional searches can be requested to create a new result set of flight options. Agents are able to combine specific options from each result set to construct and price their own solutions. This circularity and flexibility may be better understood by reference to FIG. 2.

Figure 2:
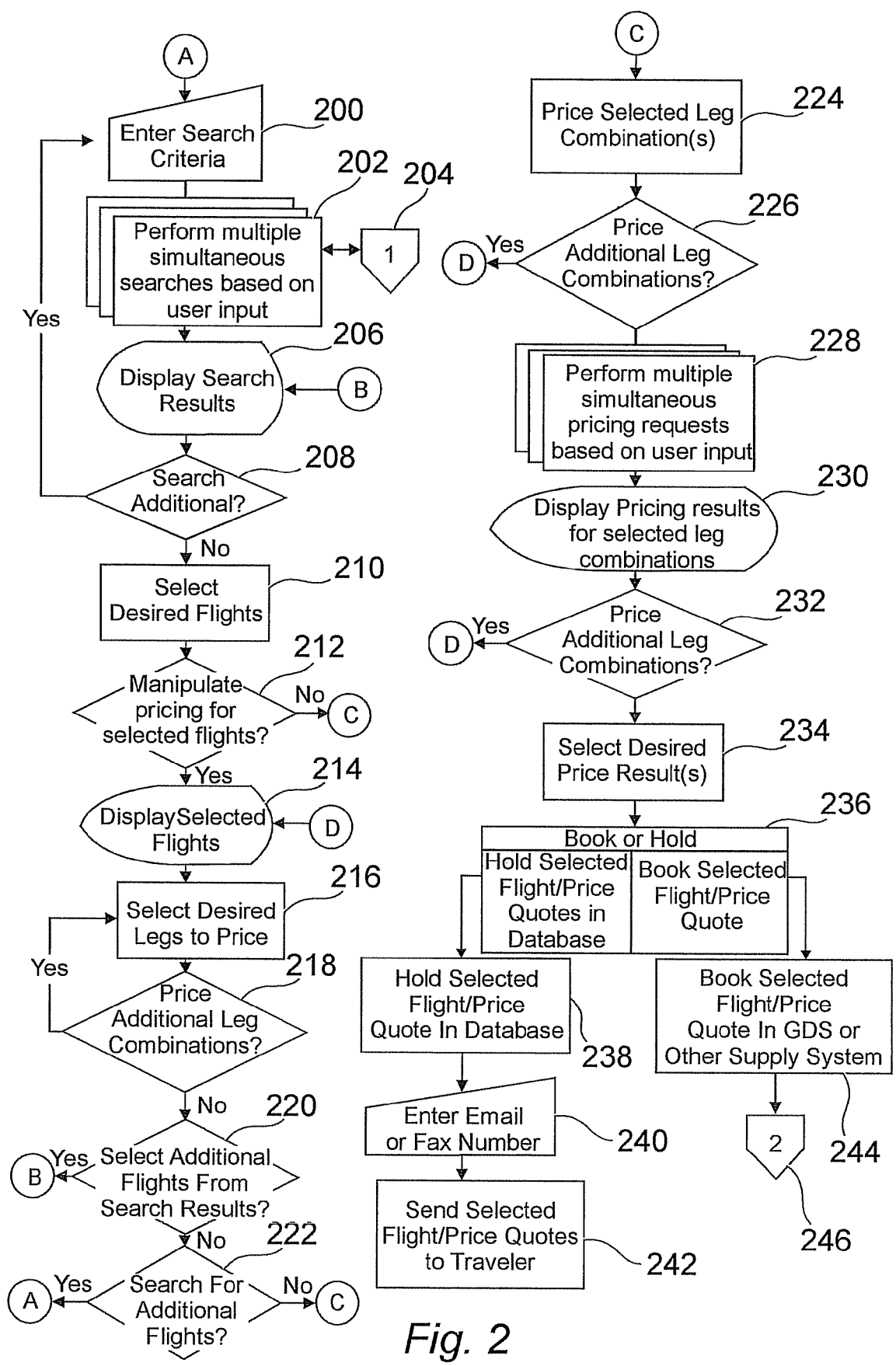
FIG. 2 is flow chart showing the steps of carrying out a search, in accordance with an embodiment of the invention, given by way of example.

Referring to FIG. 2, at a first step 200 search parameters are entered. Multiple simultaneous searches based on the search parameters are launched at step 202. Additional information may be sought by means of a further process 204 which is described below with reference to FIG. 3*a*.

At step 206 the search results are displayed from the multiple simultaneous searches. A determination is made as to whether or not additional searches are required at step 208. If yes, the process returns to step 200. If no additional searches are required, the desired flights are selected at step 210. If required, the pricing of the selected flights may be manipulated 212. If this is not required the process proceeds directly to step 224 which will be described in greater detail below. If pricing manipulation is required the selected flights are displayed at step 214 and the desired legs requiring to be priced are selected at step 216. Once all leg combinations have been priced at step 218 the process proceeds to select additional flights from the search results already generated if necessary at step 220. If additional flights (that have already been identified in the search) are required, the process returns to step 206. At step 222 a determination is made as to whether additional searches for additional flights should be carried out. If yes, the process returns to step 200. At step 224 selected leg combinations are priced. Step 226 then determines whether any additional leg combinations need to be priced. If this is the case the process will revert to step 214. Otherwise, at step 228 multiple simultaneous pricing requests based on the agent inputs are carried out. The pricing for the selected leg combinations is displayed at step 230. If additional leg combinations are still required at step 232, the process reverts again to step 214. Finally, the desired price results are selected at step 234. At this stage, at step 236, selected price or flight quotes could be held or booked. If the booking is held the flight and price quotes selection is stored in a database at step 238. Optionally at step 240, e-mail and fax details for the passenger may be located so that at step 242 selected flights and price quotes can be transmitted to the traveler. If a booking is to be made at step 244 the selected flights and price quotes are sent to the GDS to make the appropriate booking and the process may proceed to step 246 as shown in FIG. 3*b* if later changes are required, described below.

Figure 3A:
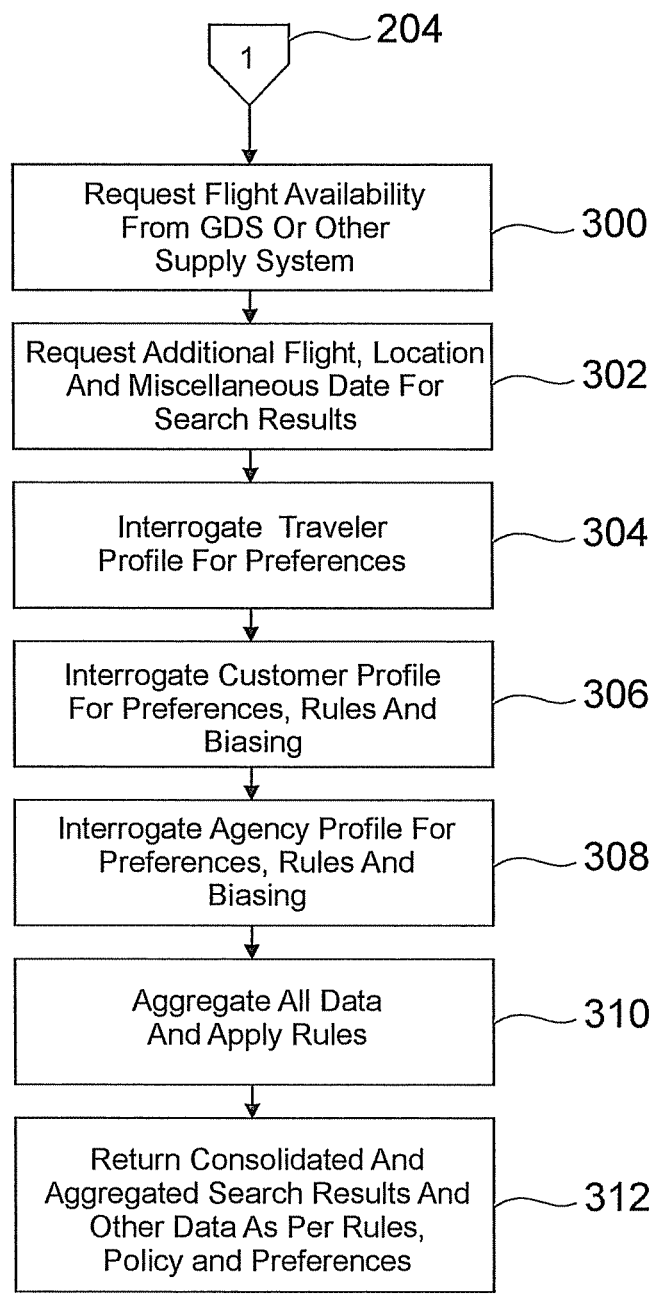
FIG. 3a is an additional section associated with the FIG. 2 flowchart in accordance with an embodiment of the invention, given by way of example.

At step 204, additional information may be obtained as is now described with reference to FIG. 3*a*. At step 300 request for flight availability from the GDS or any other supply system is made. At step 302 additional flight information, location, miscellaneous data and any other relevant information may be added to the search requests. Travel or profile may be interrogated to determine preferences at step 304. Any customer profile information for preferences, rules and biasing may be obtained at step 306. If there is any travel agent's profile information, such as preferences and rules, these are obtained at step 308. Step 310 aggregates all data and applies the relevant rules to the data. At step 312 the consolidated and aggregated search results are returned to be displayed along with any other results in step 206 of FIG. 2.

Figure 3B:
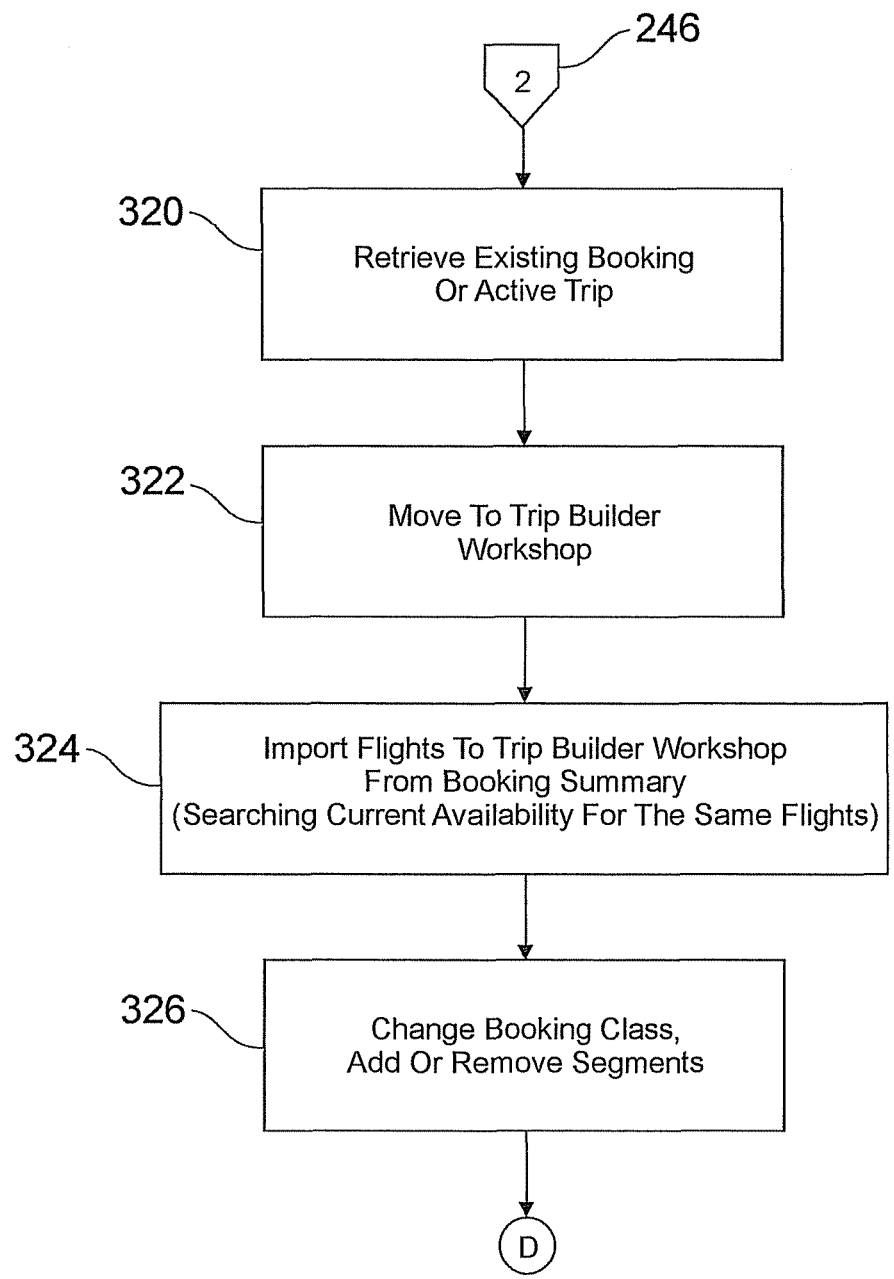
FIG. 3b is an additional section associated with the FIG. 2 flowchart in accordance with an embodiment of the invention, given by way of example.

Referring to FIG. 3*b*, after flights have been booked changes can be made in the Trip Builder Workplace as will now be described. Firstly at step 320 an existing booking or active trip is retrieved and moved to the Trip Builder Workplace 322. Further flights etc are imported to the Trip Builder Workplace from a booking summary search at step 324. The booking summary screenshot is shown in FIG. 11 and the search searches for current availability for the flights that are already booked or selected. In step 326 the agent can change booking, such as class etc and/or add or remove segments to a trip or itinerary. The process then returns to step 214 in FIG. 2. Further details of this process are described with reference to the screen shots in FIGS. 11, 12 and 13.

An agent can select specific flights for each leg of the trip and place them in the Trip Builder area of the GUI that lists all selected or desirable flights which the agent may want to manipulate to present options to a traveler. If the selected flights within the Trip Builder constitute a logical routing or trip, then the agent can price the selected flights from the Trip Builder. Agents can also opt to View these flights within the Trip Builder Workspace. In this area of the system, agents are able to complete segment select pricing to assemble several quotes for a customer. Agents are able to segment select several different combinations of flights, and request an auto pricing for each combination.

This process can be done one at a time, but the present invention also allows agents to assemble several different combinations or segment selections and submit an auto price request for all combinations at one time. The feature will price the combinations simultaneously and present the pricing solutions for each combination concurrently.

Additionally, the Amadeus Fare Analyzer returns several other pricing and flight options to the agent who can then manipulate those options to find the most desirable. If an option from the Fare Analyzer is interesting to the agent, the solution may be manipulated further, by unbundling the pricing solution from Fare Analyzer and treating those flights in the Trip Builder Workspace for further manipulation and pricing. That is, the agent has the ability to select an assembled itinerary from a low fare search results on the pricing page and bring it into the workspace. The itinerary can then be decomposed into individual segments with all available fare classes, and becomes available for further pricing manipulation via segment selection. This has many advantages over existing systems.

During this, pricing process the Flexible Agent Airflow also presents valid unused electronic tickets and integrates with Amadeus Ticket Changer functionality to price an exchange automatically if so desired.

At any point in the process, agents are able to return to the availability section of the system to add more flight options from availability to the Trip Builder Workspace, to request availability for additional legs, or modify the availability parameters for an existing leg and search again. The availability previously requested is maintained in system memory (cache) so that it does not need to be requested again.

A further feature of the system which offers advantages over known systems is the Trip Quotes control. From the Trip Builder Workspace, agents can manipulate different combinations of flights and pricing to create several different versions of a trip to share with a traveler. Each completed version of the trip can be added to the Trip Quotes section which can hold several disparate quotes for different versions of the trip. When all trip options have been assembled, the agent can select one or multiple trip options from the Trip Quotes control and elect to communicate the quotes to a traveler if required.

Figure 13:
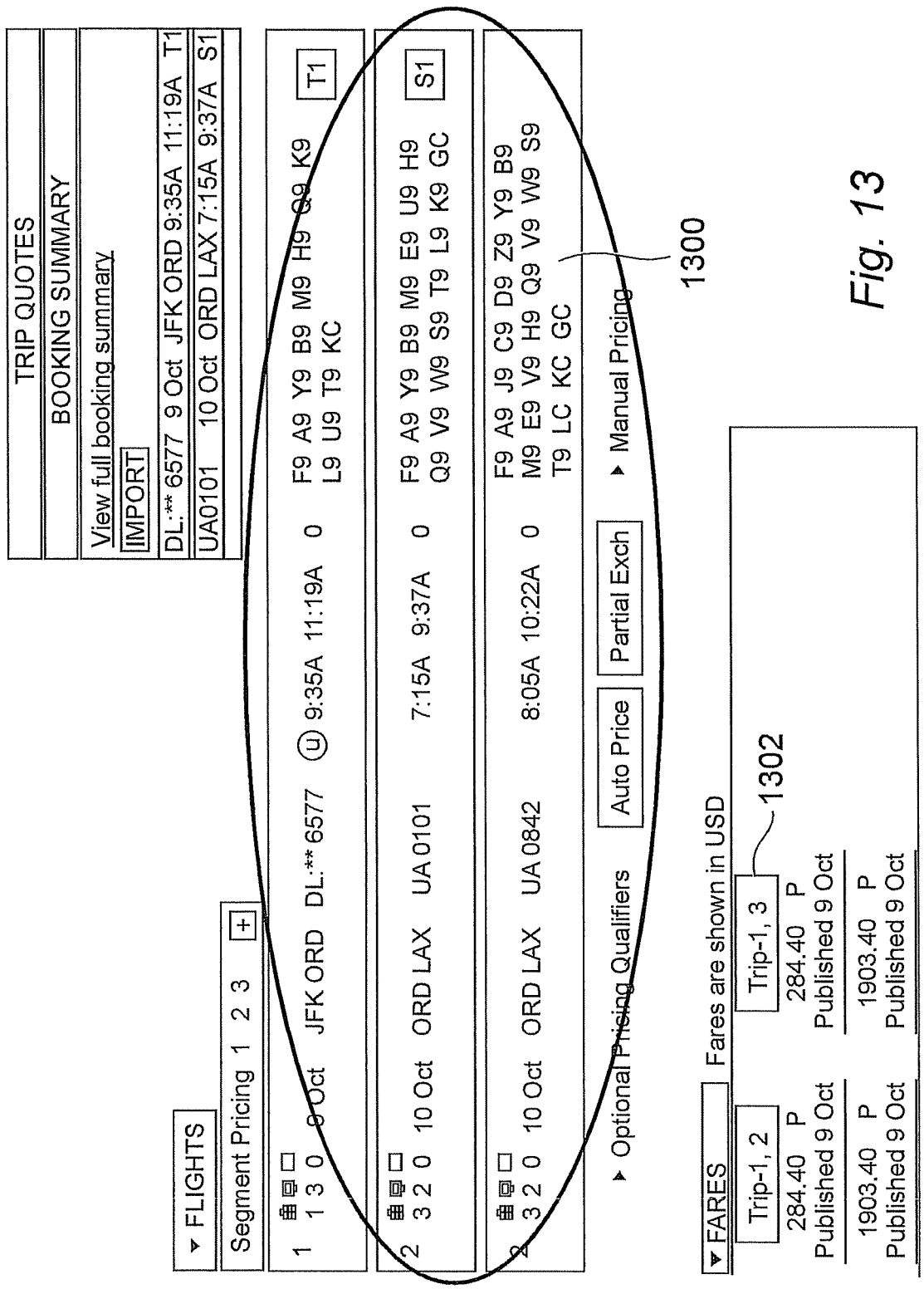
FIG. 13 is an example of a tenth screen shot associated with the system, in accordance with an embodiment of the invention, given by way of example.

A still further feature of the present invention is that post-booking itinerary modification can be implemented using the same tools as described above with respect to FIG. 3b. The capability to combine scheduled-driven and low-fare search results into a single homogeneous display in the Trip Builder Workspace is extended when travelers require a change to an existing itinerary. The itinerary may or may not have been ticketed. Other times the itinerary is in a ticketed state, but the traveler has not started to travel. Also, the traveler may have flown one or more legs of the itinerary and be requesting a change to one or more of the future legs. In any of these or similar cases, the agent can execute schedule-driven and/or fare-driven search requests for one or more of the unused leg(s) without losing the fare classes already booked. Referring to FIG. 11 a booking summary is shown. From the booking summary the Trip Builder Workspace can be accessed 1100. FIG. 12 shows the Trip Builder Workspace screenshot. Once the agent has moved back to the Trip builder Workspace, the booking summary 1200 will contain the current booked flights specifying the booking class selected by the agent. The booking summary also includes an import feature 1202. Selection of the import feature on one or more of the legs in the itinerary results the imported leg being displayed in the Trip Builder Workspace. The import is accomplished by using the same normalization logic which performs availability commands and combines schedule-driven and fare-driven results described above. At the time of the availability request, the class of service already booked may no longer be available and cannot be displayed. Since that class is actually already booked, the import functionality ensures that it is displayed in the Trip Builder Workspace so that it can be incorporated in subsequent pricing activities. In FIG. 13 the imported flights are shown along with new segments 1300 or changes to the booking class of the imported flights. The agent can then select a new itinerary if necessary 1302.

The present invention allows a travel agent to search for air flight options from multiple content and supply sources in multiple ways. The following is a non-exhaustive list of possible searches which may be carried out by an agent:
Search by Available Origin and Destination (O and D) Schedules;
Input single O and D, return results, input next O and D (looping);
Input multiple O and D, return all results (concurrent);
Add single or multiple O and D search to existing results;
Modify single or multiple O and D search criteria;
Remove all or partial O and D criteria;
Search by Available Fares;
Input all O and D, return results;
Modify or remove partial O and D, return results;
Remove all O and D criteria;
Transition Search by Available Fare to Available Schedule functionality;
Decompose priced flight results;
Re-qualify flight options within decomposed results;
Re-price and define new option combination;
Return to original fared itinerary option;
Quote, book or delete original or new option; and
Utilize optional qualifiers at the O and D or total trip level.

The agent is able to switch between available schedule search results, O and D, and flight date tabs in order to optimize the agent workflow. The agent is able to select, modify or close different tabs.

The agent is able to select specific flight options from the available schedule search results in multiple different ways. The selection can include single or multiple potential flight options per O and D; selection by Fare Family; and selection by single or multiple classes of service within single or multiple O and D.

The invention also enables the agent to hold selections in an expandable Trip Builder, similar to a shopping basket.

The system allows access to Schedule logical pricing returns configured GDS pricing, access to more GDS pricing, Web content pricing, access to pricing databases, Low Fare Search and Fare Analyzer.

The present invention has been described with reference to both software programs and applications and hardware modules. It will be appreciated that the functions carried out as part of the invention could be carried out in either software or hardware modules, irrespective of the examples given herein.

It will be appreciated that there are many variations of the various features described above, which can fall within the scope of the present invention.

What is claimed is:

1. A method for searching for a travel product from a plurality of potentially suitable travel products, the method comprising:
receiving one or more search parameters from a web-based interface;
launching multiple simultaneous searches based on the search parameters and one or more attributes of the travel product to one or more sources of data to identify the potentially suitable travel products, wherein at least one particular potentially suitable travel product comprises an itinerary including bundled data elements, and each bundled data element corresponds to a respective individual leg of the itinerary;
displaying the potentially suitable travel products on the web-based interface;
obtaining a selection of a subset of the potentially suitable travel products for further processing;

further processing the subset of potentially suitable travel products by normalizing the one or more data elements associated with the subset of potentially suitable travel products into a homogeneous display including separating each bundled data element including the corresponding respective individual leg of the itinerary of the at least one particular potentially suitable travel product; and determining at least one most suitable travel product for a customer based on preferences of the customer and the one or more attributes, wherein the at least one most suitable travel product comprises a combination of two or more separated data elements from two or more potentially suitable travel products of the subset such that the at least one most suitable travel product comprises a combination of a corresponding respective individual leg of each of the two or more separated data elements from the two or more potentially suitable travel products of the subset, wherein the combination of the two or more separated data elements of the at least one most suitable travel product includes at least one of the bundled data elements and the corresponding respective individual leg that has been separated from the itinerary of the at least one particular potentially suitable travel product.

2. The method of claim 1, wherein further processing the subset of potentially suitable travel products by normalizing the one or more data elements associated with the subset of potentially suitable travel products into a homogeneous display comprises:

searching for additional parameters associated with the subset of potentially suitable travel products.

3. The method of claim 1, further comprising:

displaying the particular potentially suitable travel product from the one or more sources;

parsing the particular potentially suitable travel product to separate out each data element;

launching multiple search requests to obtain additional dimensions of information for each bundled data element; and normalizing the resulting bundled data elements into a normalized display.

4. The method of claim 1, wherein determining the at least one most suitable travel product comprises combining the data elements from the two or more potentially suitable travel products of the subset to produce the at least one most suitable travel product from the two or more data elements of the two or more potentially suitable travel products of the subset.

5. The method of claim 1, wherein further processing the subset of potentially suitable travel products by normalizing the one or more data elements associated with the subset of potentially suitable travel products into the homogeneous display comprises:

searching for further attributes, parameters or associated data for the subset of potentially suitable travel products.

6. The method of claim 1, further comprising:

providing the web based interface in the form of one or more graphical user interfaces (GUIs).

7. The method of claim 1, further comprising:

selecting the at least one most suitable travel product for communication to the customer.

8. The method of claim 1, further comprising:

storing the at least one most suitable travel product for the customer.

9. The method of claim 1, further comprising:

booking the at least one most suitable travel product for the customer.

\* \* \* \* \*